Figure 1:
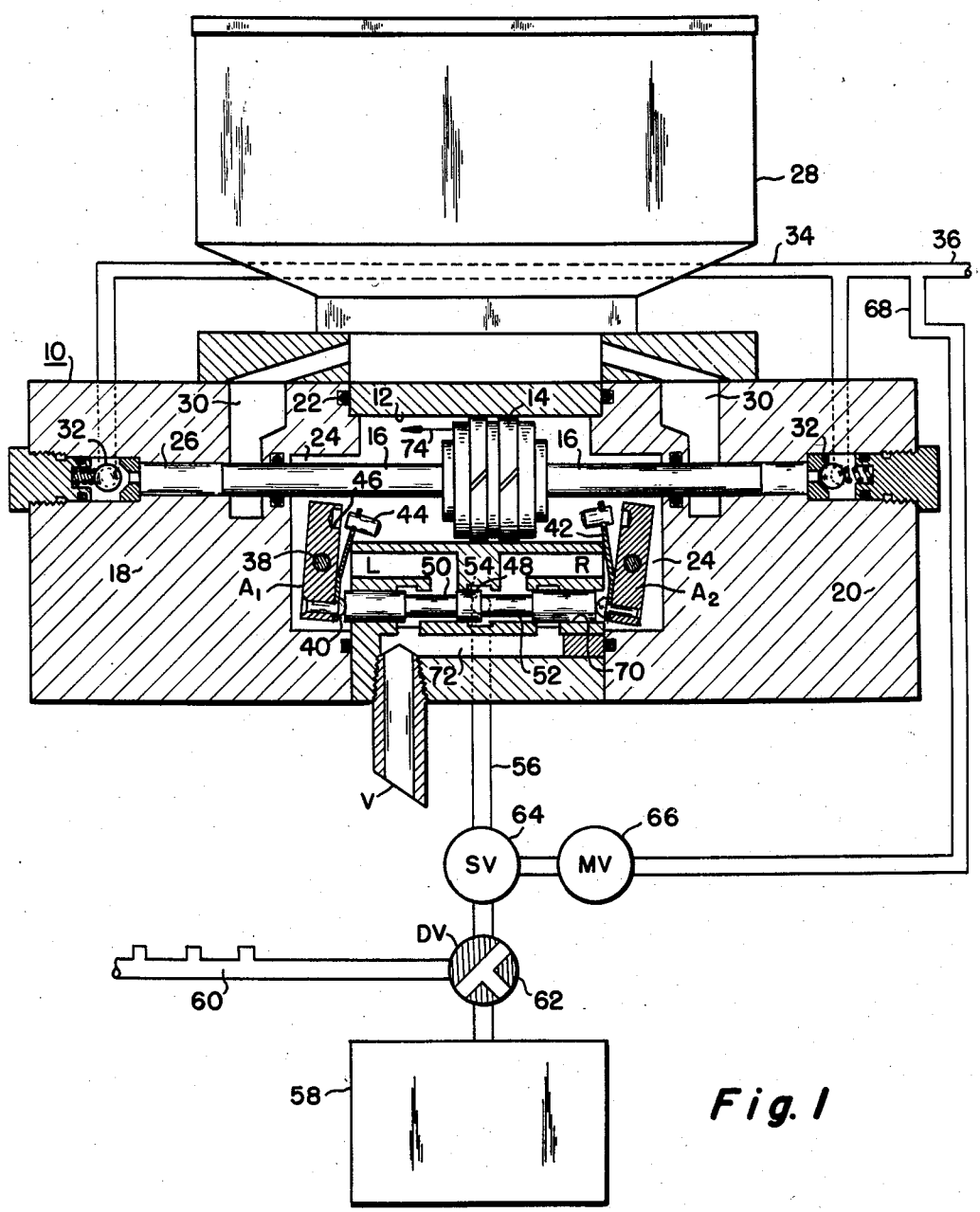

Nov. 25, 1958 E. A. HOULE 2,861,519
FLUID DRIVEN GREASE PUMP
Filed Nov. 29, 1956 3 Sheets-Sheet 1

INVENTOR.
Ernest A. Houle
BY
Webb, Mackey & Burden
HIS ATTORNEYS

INVENTOR.
Ernest A. Houle

Nov. 25, 1958     E. A. HOULE     2,861,519
FLUID DRIVEN GREASE PUMP

Filed Nov. 29, 1956     3 Sheets-Sheet 3

INVENTOR.
Ernest A. Houle
BY
Webb, Mackey & Burden
HIS ATTORNEYS

United States Patent Office 2,861,519
Patented Nov. 25, 1958

2,861,519

FLUID DRIVEN GREASE PUMP

Ernest A. Houle, Wilkinsburg, Pa., assignor to Quaker Sales Corporation, Johnstown, Pa., a corporation of Pennsylvania Application November 29, 1956, Serial No. 625,163

12 Claims. (Cl. 103—51)

This invention relates to a fluid driven pump, particularly a grease pump device of the intermittently operating type in which the drive fluid system therefor includes a power piston having a controlling valve therefor holding it in continual readiness for operation on demand at any point on its stroke and with complete freedom from the difficulty of dead center stopping.

The present invention is primarily adapted for installation on hydraulic machinery which requires frequent greasing and in which in conjunction with its own hydraulic operation the machinery provides and circulates therein a supply of hydraulic driving fluid under pressure. A ready source of hydraulic fluid is therefore available to operate the grease pump and this fluid is appropriately diverted at the proper time and applied as indicated to the power piston which in turn operates the grease pump device to generate adequate grease pressure. A diversion valve is provided to bleed off a portion of the flow of the normal hydraulic fluid for this grease pump work and a fitting on that valve provides for attaching the fluid driving mechanism in the pump directly thereto.

According to a feature of this invention the above indicated main or power piston in the pump drives the pump on demand and will continue to oscillate through its strokes as long as the grease or other lubricant being pumped is being consumed; if not, it comes to rest in a state of equilibrium with a force balance established between the working pressure on one face of the piston and the grease outlet pressure which the piston must overcome. The pump action does not actually stop dead, however, but the piston usually continues at a low or hardly perceptible rate as a practical matter in order to compensate for slight internal leakage and at this rate a combination of positively exerted forces on the controlling valve must be applied preferably in an overlapping sequence so as to be constantly preventative of dead center stopping of the piston. More specifically, this dead center stopping in comparative structures tends to occur at the end of the stroke of the piston and in the present invention, a pair of rocker arm connections is provided for mechanically centering the controlling valve from either of its opposite operating positions when the piston approaches the corresponding end of its stroke. Additionally, a valve tappet is provided on each rocker arm in conjunction with a power storing biasing spring therefor which is adapted to be preloaded as the piston approaches final movement, thereby positively eliminating clearance between the tappet and valve during final piston movement and causing the valve to be mechanically moved off center by the expanding spring into an operating position opposite to the one from which carried by the piston. Also, a novel arrangement between the piston and valve is provided whereby the latter is hydraulically loaded under reaction fluid pressure proportional to the working pressure on the face of the piston so as to keep the control valve from drift- ing out of working position. The present invention consolidates several important functions in a one-piece spool structure forming the control valve so as to eliminate several of the additional parts required for these functions in comparative devices.

Further features, objects, and advantages will either be specifically pointed out or become apparent when, for a better understanding of the invention, reference is made to the following description of a preferred embodiment thereof taken in conjunction with the accompanying drawings in which:

Figure 1 is a partially schematic longitudinal sectional view of a system embodying the present invention;

Figures 2, 3, 4, and 5 are fragmentary showings similar to Figure 1 and illustrating the parts in various operating positions.

In the drawings a fluid operated grease pump according to the present invention includes a case 10 containing a cylinder 12, a double acting piston 14 therein dividing the cylinder into opposite working chambers, and a piston rod 16 of conventional construction.

Two chambered cylinder heads 18, 20 are sealed at 22 to the opposite ends of the cylinder 12 and are each formed with a rocker arm chamber 24 and a cylindrically shaped grease pump chamber 26 therein. The natural shape of the piston rod 16 is such as to form grease pump plungers at its opposite ends which are sealed to slide in the cylindrical grease pump chambers 26 and these chambers contain grease or lubricant with which they are cyclically replenished from a reservoir 28 through a pair of grease pump inlet passages 30. The piston rod 16 forces grease alternately from the chambers 26 so as to unseat a spring-loaded ball check valve 32 communicating therewith and force grease under line pressure into a set of outlet line connections 34 leading into a grease manifold 36.

Two rocker arms A1 and A2 are pivoted at 38 in the respective rocker arm chambers 24 to fulcrum on a fixed axis through their midportions. In the interest of brevity only the rocker arm A1 is described in detail. This rocker arm A1 includes a valve tappet 40 which may be an integral portion of the arm or a separate rivet as illustrated, but which in any case is peened over to secure to the rocker arm one leg of a flat spring 42. The flat spring 42 is formed with a permanent bend in the middle so as to be slightly arch-shaped between its ends one of which carries a solid cylindrically shaped wear element 44. The wear element is hardened metal in order to take the wear of constant impact of the piston 14 and is crush-proof to thereafter provide a solid connection between the piston and the rocker arm A1.

In its free state the spring expands into the indicated arch shape as shown in the solid lines in Figure 1, but when it is straightened out by the piston such that the wear element 44 fits into a socket 46 on the arm A1, the spring operates as an elastic power storing device. The tappet 40 on the rocker arm A1 engages an end of a one-piece control valve 48 having three spools with the center spool disposed between a pair of intermediate lands 50 and 52. The valve 48 reciprocates in a transversely spaced path to the piston 14 in a manner to slide the center spool in opposite directions from an inlet port 54 which it covers, the port 54 being supplied with hydraulic fluid through a supply line 56 which is connected to a conventional source 58 of hydraulic fluid maintained under pressure.

The socket 46 is located at the inward end of the rocker A1 which protrudes in this direction from the pivot 38 so as to be operatively disposed in the path of motion of the piston 14 whereas the tappet 40 is located outwardly of the pivot 38, being at the opposite end of the arm A1 so as to be completely outside the path of the piston 14 and and in alignment with the end of the valve 48. Thus the rocker arm A1 establishes a completely mechanical path of connection in the chamber 24 between the piston 14 and the valve 48 whereas the interior of the chamber itself establishes a direct hydraulic path of communication between the piston 14 and the valve 48 with the effect of hydraulically loading the adjacent end of the valve under reaction fluid pressure proportionate to the working pressure on the piston.

The hydraulic fluid source 58 contemplated is a conventional one found on usual hydraulic machinery to supply a manifold 60 for operating the machinery and is suitably connected thereto through a diversion valve 62 which is included in the supply line 56. A slave valve 64 having a mechanical interconnection to a master valve 66 is interposed in the supply line 56 posterior to the diversion valve 62 for controlling the speed of reciprocation of the piston 14. The master valve 66 communicates through a conduit 68 with the pump outlet line 34 so as to operate in response to the grease line pressure. In a conventional way the master valve 66 is set to operate at or above a predetermined grease pressure to close the slave valve 64 and interrupt hydraulic fluid to the valve inlet 54.

The control valve 48 slides in the bore of a valve chamber 70, the heads of which may be integral with the heads 18 and 20 of the cylinder. A valve chamber passage L which the land 50 operatively connects to the valve inlet 54 communicates with the working chamber at the left end of the cylinder 12 as viewed in the drawings. Similarly, a valve chamber passage R is supplied with fluid passing the land 52 and communicates with the working chamber at the right end of the cylinder 12 as viewed in the drawings. The respective lands 50 and 52 alternate with one another in the usual manner to return hydraulic fluid from the cylinder 12 into a common drain passage 72 having a vent connection V for return to the reservoir of the hydraulic system, not shown.

In one physically constructed embodiment of the invention, the effective area of the piston 14 was roughly 15 times the effective area of each plunger portion at the ends of the piston rod 16 and the operation of the piston 14 was such that under pressure of 500 p. s. i. and a hydraulic fluid flow of 5 gallons per minute the pump delivered grease roughly under 7500 p. s. i. line pressure at a rate of approximately ⅓ gallon per minute. The master valve 66 was set to trip the slave valve 64 open immediately the grease pressure dropped to 7500 p. s. i. and the capacity of the device was such as to render it capable of delivering grease up to 10,000 p. s. i. line pressure under proper hydraulic driving pressure applied thereto. Although primarily adapted for intermittent operation the piston 14 maintained a sustained speed of approximately 200 strokes per minute to deliver the required grease volume of one-third gallon per minute in accordance with the design requirements. In normal operation, the machinery contemplated requires approximately 45 minutes down time for greasing which occurs once during each 8 hour period of operation.

The order in which the figures of drawing are numbered follows an operating sequence of the present grease pump. In Figure 1, the control valve 48 is shown with its center spool off center to the left of the valve inlet 54 in a position causing the piston 14 to slide with a longitudinal stroke in the direction of the arrow 74. In this position of the valve 48 the valve chamber passage R at one of the ends of the cylinder 12 is pressurizing the working chamber at that end with pressure fluid and the valve chamber passage L at the opposite end of the cylinder 12 is receiving exhausted fluid from the working chamber at that end and continues discharging it past the land 50 into the vent V until the point at which the valve 48 recenters so as to block the discharge enabling the piston 14 then to trap a cushion of fluid thereahead in the closed chamber of the cylinder head. When the back pressure in the grease manifold 36 reaches a sufficient value it hydrostatically balances the plunger on the end of the piston rod 16 to bring the piston 14 into a state of equilibrium therewith and the spring loaded ball check valve 32 at the end of the appropriate grease pump chamber 26 remains lightly balanced on its seat.

Figure 2:
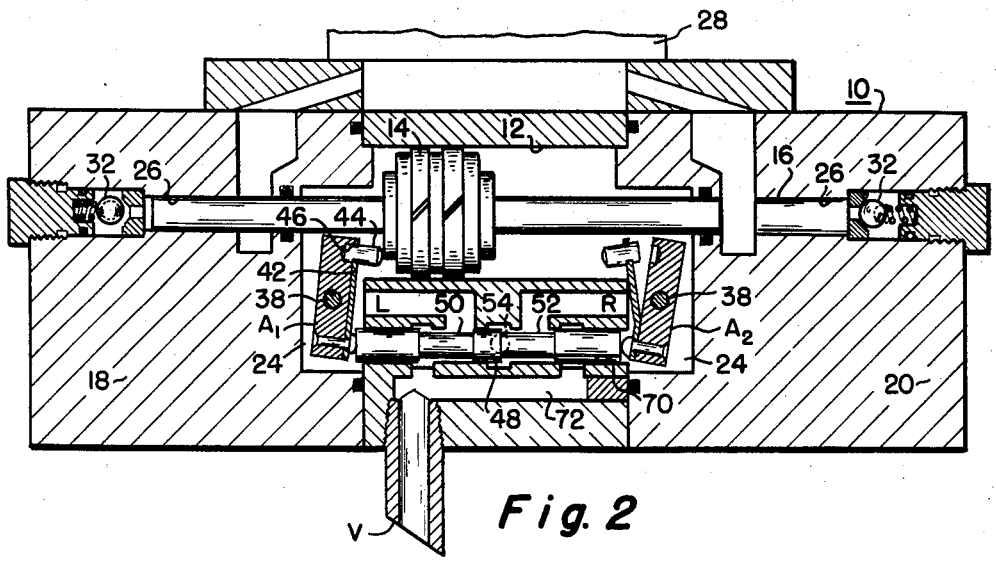
Figure 3:
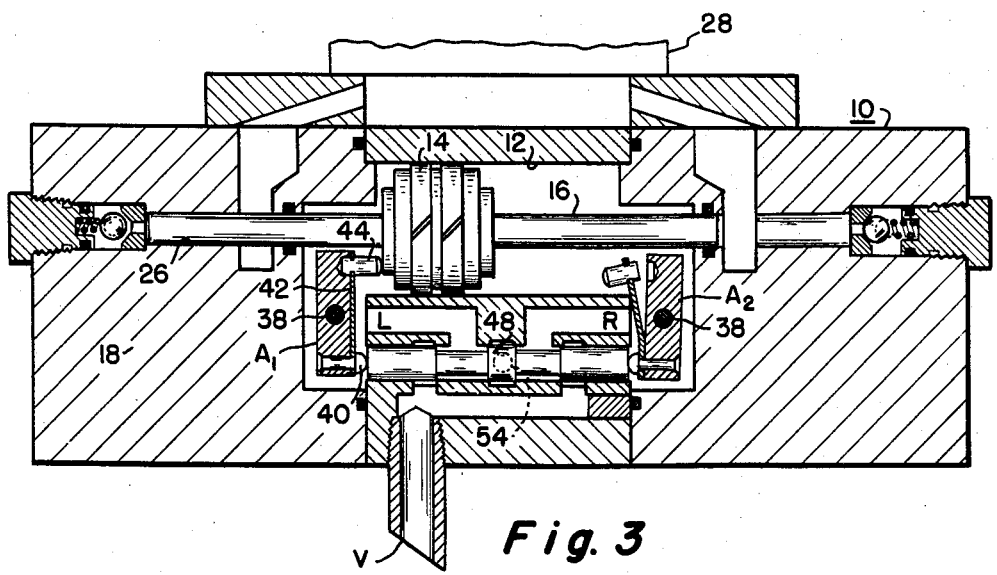

In Figure 2, the piston 14 is shown after it initially engages the wear element 44 so as to force it to bottom within its socket 46 and it thereby straightens out the spring 42 to store energy therein, the rocker arm A1 remaining stationary in a tilted position during this period. In Figure 3, the piston 14 has already undergone final movement at the end of its stroke and the solid connection provided by the wear element gives to the rocker arm A1 the preliminary movement necessary to force it into a vertical position. Due to the presence of the tappet 40, the final piston motion carries the valve 48 through its preliminary movement toward a centered position and at or before the point at which the valve 48 is centered, the power storing spring 42 begins to release its energy by expanding owing to the fact that the valve 48 controls the power cylinder differential pressure and in such movement reduces this pressure at least slightly, if not fully. Owing to this residual pressure, the piston 14 cannot back away from the rocker arm A1.

Thus the piston loads the valve in two stages, first by collapsing the spring 42 just prior to final movement so as to preload the valve, and then the final motion of the piston is the motion sufficient to mechanically center the valve 48.

Figure 4:
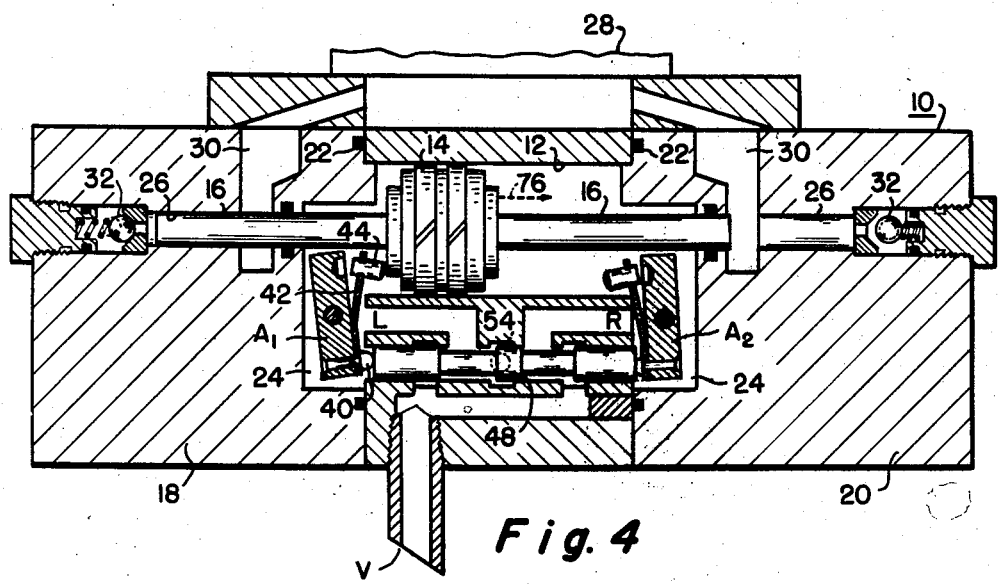

The spring 42, being virtually unopposed, expands with a snap action into its normal arch shape so as to cause rapid separation between it and the side of the rocker arm A1 and their separated position is shown in Figure 4. Accordingly, the valve 48 has its center spool abruptly shifted off-center in attaining its final full travel to the right as viewed in Figure 4 so as to introduce hydraulic working pressure into the valve chamber passage L. The passage L directs the hydraulic fluid into the working chamber at that end of the cylinder 12 and a pressure proportionate to the working pressure is also applied against the adjacent end of the valve 48 so as to supplement the mechanical biasing force of the released spring 42 with a hydraulic loading pressure to keep the valve from drifting out of working position. Thereafter, the piston 14 starts an opposite stroke moving away from the tappet wear element 44 in a direction indicated by the arrow 76 of Figure 4, but the hydraulic loading pressure on the valve 48 keeps the valve from drifting out of the operating position. The rocker arm A2 rocks in synchronized movement with the one-piece valve 48 as the rocker arm A1 shifts the latter, thereby having its upper end moved into a position directly in the path of the piston 14 and positively held there under thrust from the fluid loading pressure at the opposite end of the valve 48.

Figure 5:
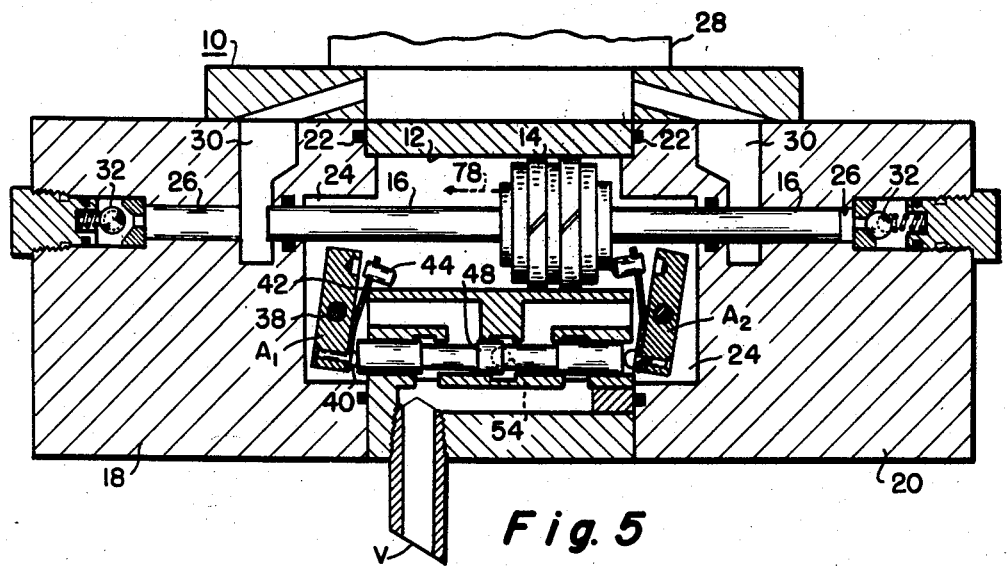

Figure 5 shows the piston 14 at the opposite end of its stroke in which it has caused the rocker arm A2 to move out of the path thereof so as to shift the valve 48 to its off-center position to the left corresponding to Figure 1, thus completing the cycle which is then repeated.

The present consolidation of structure in the one-piece spool valve 48 enables it to do two things in addition to directing fluid to the piston. The end spools carried thereby present fluid loaded plunger surfaces on which the working fluid pressure thrusts to force the valve to stay in working position. The elongated shape of the valve overall provides a complete slide rod interconnection between the coordinated rocker arms A1 and A2. Thus one valve does what is required of several separate parts in comparative devices.

Hydraulic machinery of the type specifically contemplated to be fitted with the present grease pump is employed in mining machinery installations requiring complete lubrication by means of grease guns, not shown, after several sustained hours of operation. Broadly, however, the present grease pump is applicable to earth movers and various other types of transportable hydraulic machinery requiring on-the-spot lubrication.

Variations within the spirit and scope of the invention described are equally contemplated by the foregoing description.

I claim:

1. In a fluid driven pump, a main piston and a main cylinder divided thereby into opposite working chambers, a grease pump and cylinder disposed at each end of and operatively connected to the main piston, a one-piece valve disposed in a transversely spaced arrangement to the path of the main piston and having fluid loaded plunger surfaces at its ends in constant communication with the piston working chamber at that end, a pair of chambered cylinder heads sealed to the opposite ends of the main cylinder and each formed with one of said grease cylinders and with a fulcrum chamber therein, a pair of fulcrumed structures rockable therein to operatively connect the main piston and the valve and each including an elastic member having an end in the path of the main piston so as to be directly carried by the piston motion, and having a valve-shifting, opposite end disposed outside the path of motion of the piston for independent movement, said valve plunger surfaces being arranged at said opposite ends with respect to said fulcrumed structures so as to be spring loaded by the elastic member under a positive mechanical bias to constantly force the valve to shift when the main piston reaches the end of the stroke.

2. In a pump structure, a main piston and a cylinder divided thereby into opposite working chambers, fluid directing means connected to said working chambers comprising a pressure differential creating valve which is slidable in a transversely spaced relationship to the path of the main piston and which at a predetermined point in its movement reduces the effective differential across the piston, said valve occupying approximately a centered position at said point through which it passes in order to complete each movement between its opposite, differential creating positions, a rocking means rockable to operatively connect the main piston and the valve in response to final piston movement at the end of a stroke for mechanically recentering said valve, precompressible mechanical means on said rocking means which releases with a spring snap action in response to said reduction in effective differential pressure to apply the necessary mechanical energy to complete said valve movement, said mechanical means including an elastic member having one end in the path of the main piston so as to be directly carried by piston motion and having an outside end disposed outside of the path of piston motion for independent movement, said valve having fluid-loaded plunger surfaces at its ends each in constant communication with the piston working chamber at that end and also engageably moving with the outside end of the elastic member and spring loaded thereby under a positive bias to mechanically force the valve to shift when the main piston reaches an end of the stroke.

3. A grease pump structure having a main piston and cylinder defining opposite working chambers, a one-piece valve reciprocable in a transversely spaced path to the strokes of the main piston, said valve having fluid-loaded plunger surfaces at the opposite ends each constantly communicating with the piston working chamber at that end, means pivoting a formed spring so that it moves into an operative disposition presenting one end in the path of the main piston whereby it is directly carried by piston motion and having an outside end disposed outside of the path of piston motion for independent movement in alignment with the end of the valve, and tappet and wear elements carried at the opposite ends of said spring and loaded by the piston and intervening spring under a positive mechanical bias to constantly force the valve to shift when the main piston reaches an end of the stroke.

4. In a grease pump structure, a main piston and a main cylinder divided thereby into opposite working chambers, a grease pump and cylinder disposed at each end of and operatively connected to the main piston, a one-piece slide valve disposed in transversely spaced arrangement to the path of the main piston and having fluid-loaded plunger surfaces at its ends in constant communication with the piston working chamber at that end, a pair of chambered cylinder heads sealed to the opposite ends of the main cylinder and each formed with one of said grease cylinders and with a fulcrum chamber therein, a pair of fulcrumed structures rockable therein to operatively connect the main piston and the slide valve and each including an elastic member having an end in the path of the main piston so as to be directly carried by the piston motion, and having a valve-shifting, opposite end disposed outside the path of motion of the piston for independent movement, and a hardened wear element carried by said one end of the elastic member to take the direct impact of the piston and confronting a companion socket formed on the fulcrumed means so as to occupy the same when carried by piston motion thereby operatively forming a solid connection to the fulcrumed structure, and a valve tappet element arranged on each of said fulcrumed structures so as to be spring loaded by the elastic member under a positive mechanical bias against said fluid-loaded plunger surfaces to constantly force the valve to shift when the main piston reaches the end of the stroke.

5. Fluid driven pump structure having a power cylinder and a valve bore disposed therein in transversely spaced apart relationship, a double acting piston in said cylinder dividing it into opposite working chambers, rocker arms each pivoted with a fixed fulcrum axis between its opposite ends and so arranged with a different one of the rocker arms extending between each end of the cylinder and a corresponding end of the valve bore, a one-piece control valve in said valve bore hydraulically connected to control the motion of said piston and being shiftable between opposite operating positions to reverse the piston stroke, said valve having fluid-loaded plunger surfaces at the opposite ends each constantly communicating with the piston working chamber at that end, the valve tappet means on the respective rocker arms aligned with each end of the valve, said valve constituting the sole hydraulic control means and sole mechanical connection between said rocker arms such that they move one another into an operative disposition near each end of the piston stroke and being deflectable by the piston to force the tappet means to move the control valve toward a centered position, and elastic power storing means preloaded by the piston just prior to reversing at each end of its stroke and effective after the piston stops to keep the rocker arm at that end and the valve locked in phase with one another with the tappet means solidly engaged under positive loading pressure against the valve to force it to overtravel past the centered position to which the piston moves it.

6. Fluid driven pump structure having a power cylinder and a valve chamber disposed therein in transversely spaced apart relationship, a double acting piston in said cylinder dividing it into opposite working chambers, rocker arms each pivoted with a fixed fulcrum axis between its opposite ends and so arranged that a different rocker arm extends between each end of the cylinder and a corresponding end of the valve chamber, a one-piece control valve in said valve chamber hydraulically connected both to direct fluid to and to exhaust fluid from the faces of said piston and being shiftable between opposite operating positions to reverse the piston stroke, valve tappet means on the respective rocker arms aligned with ends of the valve, the corresponding ends of said valve chamber and cylinder having a common head structure with a chambered interior providing for continual, direct communication between the valve chamber and the working chamber at each end of the cylinder for holding the end of the valve in either operating position under a hydraulic loading pressure proportional to operating pressure on the piston, said valve constituting the sole hydraulic control means and the sole mechanical connection between said rocker arms such that they move one another into an operative disposition near each end of the piston stroke and being deflectable by the piston to force the tappet means to move the control valve toward a centered position, and elastic power storing means preloaded by the piston just prior to reversing at each end of its stroke and effective after the piston stops to keep the rocker arm at that end and the valve locked in phase with one another with the tappet means solidly engaged under positive loading pressure against the valve to force it to overtravel past the centered position to which the piston moves it.

7. Pump structure according to claim 6 wherein the tappet means is spring loaded by the elastic power storing means with sufficient strength that when the piston motion carries the valve far enough toward said centered position to at least partially neutralize the cylinder differential pressure, the elastic means causes the tappet means to rapidly drive the valve to the opposite operating position.

8. A pump system embodying the structure of claim 6 and further including a grease pump driven by the piston having a grease outlet line connection, controlled means to supply the control valve with pressure fluid for application to the piston, and means responsive to grease line pressure for controlling the supply of pressure fluid to the control valve for application to the piston.

9. A pump system embodying the structure of claim 6 and further including a grease pump chamber having inlet and outlet line connections, a plunger therein drivingly connected to the double acting piston, means connected to supply the control valve with pressure fluid for application to the piston and including a slave valve controlling said connection, and means connected to control said slave valve and sensitive to line pressure maintained in said grease pump outlet connection for initiating operation of the piston in response to a predetermined minimum value of grease pressure.

10. Pump structure according to claim 6 wherein the power storing means is constituted by formed leaf springs which are connected to said tappet means and which expand in free state into an arched position to mechanically move said valve, said leaf springs and valve being arranged such that when the piston motion carries the valve to a point substantially neutralizing the differential pressure which hydraulically loads the valve, the latter is mechanically moved by the unopposed expanding spring into an opposite operating position.

11. Hydraulically operated pump structure having a power cylinder and a valve chamber disposed therein in transversely spaced apart relationship, a head structure common to one end of the cylinder and valve chamber and providing for constant communication therebetween, said head structure further having a grease cylinder therein axially aligned with the power cylinder, a main piston slidable in said power cylinder and operatively driving a piston plunger portion which protrudes into the grease cylinder in said head to pump substances therefrom, a valve in said valve chamber having a fluid-loaded plunger surface exposed to the power cylinder pressure for holding the valve in an operating position under operating pressure proportionate to working pressure on the piston, and rockably mountable means providing a direct mechanical connection between the piston and said fluid-loaded plunger surface of the valve.

12. Pump structure according to claim 11 wherein said rockably mountable means is rockable in response to final piston movement at the end of a stroke for mechanically recentering said valve to a pressure neutralizing position, and including energy storing means thereon which releases with a spring snap action in response to pressure neutralizing position of the valve to apply the necessary mechanical energy to complete movement of said valve into an operating position for reversing motion of the piston.

References Cited in the file of this patent

UNITED STATES PATENTS

| 203,801 | Waring et al. | May 14, 1878 |
| 343,569 | Cooper | June 15, 1886 |
| 1,500,975 | Whitted | July 8, 1924 |
| 1,858,979 | Barks | May 17, 1932 |